United States Patent
Chang et al.

(10) Patent No.: US 11,223,273 B2
(45) Date of Patent: Jan. 11, 2022

(54) SUB-HARMONIC OSCILLATION CONTROL IN PEAK CURRENT LIMIT MODE SWITCHING SYSTEM

(71) Applicant: SEMICONDUCTOR COMPONENTS INDUSTRIES, LLC, Phoenix, AZ (US)

(72) Inventors: Yung-I Chang, Taipei (TW); Gabriel Eirea, Cupertino, CA (US); Shawn Laliberte, Newton, NH (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 99 days.

(21) Appl. No.: 16/860,804

(22) Filed: Apr. 28, 2020

(65) Prior Publication Data

US 2021/0336527 A1 Oct. 28, 2021

(51) Int. Cl.
| | |
|---|---|
| *H02M 1/14* | (2006.01) |
| *H02M 1/12* | (2006.01) |
| *H02M 1/00* | (2006.01) |
| *H02M 3/156* | (2006.01) |
| *H02M 3/158* | (2006.01) |

(52) U.S. Cl.
CPC ........... *H02M 1/12* (2013.01); *H02M 1/0025* (2021.05); *H02M 1/14* (2013.01); *H02M 1/143* (2013.01); *H02M 1/0003* (2021.05); *H02M 1/0038* (2021.05); *H02M 3/156* (2013.01); *H02M 3/158* (2013.01)

(58) Field of Classification Search
CPC .......... H02M 1/08; H02M 1/088; H02M 1/12; H02M 1/14
See application file for complete search history.

(56) References Cited

U.S. PATENT DOCUMENTS

| | | | |
|---|---|---|---|
| 7,932,709 B1* | 4/2011 | Ling | H02M 3/156 323/285 |
| 2007/0252567 A1 | 11/2007 | Dearn et al. | |
| 2008/0088292 A1* | 4/2008 | Stoichita | H02M 3/156 323/285 |
| 2011/0234188 A1* | 9/2011 | Chiu | H02M 1/14 323/282 |
| 2012/0086480 A1* | 4/2012 | Lin | H02M 1/12 327/133 |

* cited by examiner

*Primary Examiner* — Kyle J Moody
*Assistant Examiner* — Jye-June Lee
(74) *Attorney, Agent, or Firm* — AMPACC Law Group, PLLC

(57) ABSTRACT

An electronic circuit includes a Pulse Width Modulation (PWM) circuit, a sub-harmonic reduction circuit, and a voltage feedback circuit. The PWM circuit produces a PWM signal according to a voltage control signal, a current of the electronic circuit, and a maximum duty cycle. When the electronic circuit is operating in a peak current limit mode, the sub-harmonic reduction circuit generates a feedback adjustment signal according to whether the current of the electronic circuit exceeds a peak current limit, whether a duty cycle of the PWM signal is greater than or equal to the maximum duty cycle, whether the voltage control signal is controlling the duty cycle of the PWM signal, or combinations thereof. The voltage feedback circuit generates the voltage control signal according to an output voltage produced using the PWM signal, a value of a reference voltage, and a value of the feedback adjustment signal.

20 Claims, 4 Drawing Sheets

SUB-HARMONIC OSCILLATION CONTROL IN PEAK CURRENT LIMIT MODE SWITCHING SYSTEM

FIELD OF THE DISCLOSURE

The present disclosure relates to reducing sub-harmonic oscillation in a switched-mode circuit operating in peak current limit mode.

BACKGROUND

A switching mode circuit, such as a switched-mode power supply (SMPS), controls a current by turning one or more power switches (for example, one or more power transistors) on and off. The switching mode circuit may be configured to switch the power switches according to a sensed current flowing in an energy-storing inductor. The switching mode circuit may further be configured to limit a peak magnitude of the current flowing in the energy-storing inductor so that it is less than or equal to a peak current limit.

The switching mode circuit may be subject to sub-harmonic oscillations that cause noise on the output of the switching mode circuit. When the current through the energy-storing inductor is less than the peak current, the sub-harmonic oscillations may be reduced by adding a compensation ramp to the sensed current in the energy-storing inductor, and switching the power switches according to the result of that addition. However, this technique does not work well when the current flowing in the energy-storing inductor is being limited by the peak current limit; that is, when the switching mode circuit is in peak current limit mode.

It would be advantageous to be able to reduce sub-harmonic oscillations in a switching mode circuit operating in peak current limit mode.

BRIEF DESCRIPTION OF THE DRAWINGS

In the accompanying figures like reference numerals refer to identical or functionally similar elements throughout the separate views, together with the detailed description below, and are incorporated in and form part of the specification to further illustrate embodiments of concepts that include the claimed invention and explain various principles and advantages of those embodiments.

DETAILED DESCRIPTION

Embodiments relate to reducing sub-harmonic oscillation in switching mode circuits when the switching mode circuits are operating in a peak current limit mode.

In the following detailed description, certain illustrative embodiments have been illustrated and described. As those skilled in the art would realize, these embodiments may be modified in various different ways without departing from the scope of the present disclosure. Accordingly, the drawings and description are to be regarded as illustrative in nature and not restrictive. Like reference numerals designate like elements in the specification.

In an embodiment, an electronic circuit includes a Pulse Width Modulation (PWM) circuit, a sub-harmonic reduction circuit, and a voltage feedback circuit. The PWM circuit produces a PWM signal according to a voltage control signal, a current of the electronic circuit, and a maximum duty cycle. When the electronic circuit is operating in a peak current limit mode, the sub-harmonic reduction circuit generates a feedback adjustment signal according to whether the current of the electronic circuit exceeds a peak current limit, whether a duty cycle of the PWM signal is greater than or equal to the maximum duty cycle, whether the voltage control signal is controlling the duty cycle of the PWM signal, or combinations thereof. The voltage feedback circuit generates the voltage control signal according to an output voltage produced using the PWM signal, a value of a reference voltage, and a value of the feedback adjustment signal.

In an embodiment, when a PWM circuit is operating in a peak current limit mode, a sub-harmonic reduction circuit operates to reduce sub-harmonic oscillations in the output of the PWM circuit by using an up/down counter to adjust a feedback signal and by dynamically controlling a maximum duty cycle of a PWM signal.

Figure 1:
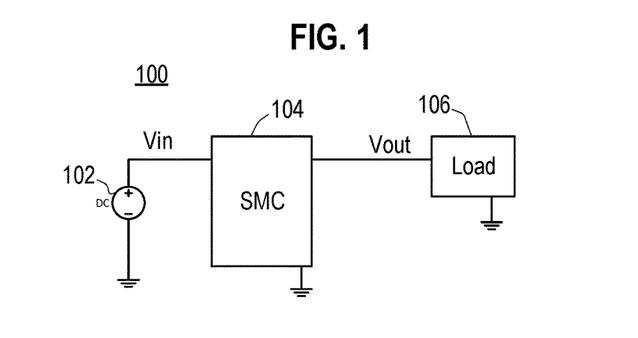
FIG. 1 illustrates a circuit according to an embodiment.

FIG. 1 illustrates a circuit 100 according to an embodiment. The circuit 100 includes a power source 102, a switching mode circuit (SMC) 104, and a load 106.

The power source 102 supplies a direct current (DC) input voltage Vin to the SMC circuit 104. The power source 102 may include a primary or secondary battery, an Alternating Current (AC) to DC conversion circuit, a power factor correction (PFC) circuit, or combinations thereof.

The SMC 104 uses the input voltage Vin to produce an output voltage Vout, which is provided to the load 106. The SMC 104 produces the output voltage Vout by switching an input current derived from the input voltage Vin on and off. The SMC 104 may be a switched mode power supply (SMPS), but embodiments are not limited thereto.

The SMC 104 may switch the input current on and off using Pulse Width Modulation (PWM), Pulse Frequency Modulation (PFM), or combinations thereof. In an embodiment, the SMC 104 is a fixed frequency PWM circuit wherein pulses occur at a fixed frequency but have varying durations (widths). In an embodiment, the SMC circuit 104 may switch the input current using current mode control, that is according to a magnitude of a current flowing in the SMC 104 (such as an inductor current).

Feedback loops including those caused by parasitic inductances and capacitances may cause unwanted oscillations in the output voltage Vout. These unwanted oscillations may occur at frequencies less than the frequency at which the SMC 104 switches the input current and may therefore be referred to as sub-harmonic oscillations.

The SMC 104 may impose a limit on a peak magnitude of a current (for example, an inductor current) flowing in the SMC 104, the limit being referred to as a peak current limit. When the peak magnitude of the current reaches or exceeds the peak current limit, the SMC 104 may begin operating in a peak current limit mode. When the SMC 104 is operating in the peak current limit mode, techniques used to reduce or eliminate sub-harmonic oscillations when the SMC 104 is not operating in the peak current limit mode may not be effective.

Accordingly, in embodiments the SMC 104 may be configured to use different techniques to reduce or eliminate sub-harmonic oscillations when the SMC 104 is not operating in the peak current limit mode. For example, the SMC 104 may dynamically adjust a voltage feedback loop, dynamically adjust a maximum duty cycle, or both in order to reduce or eliminate sub-harmonic oscillations. Dynamically adjust the voltage feedback loop may include adding a dynamically determined offset to a feedback voltage, or subtracting the dynamically determined offset from a reference voltage.

Figure 2:
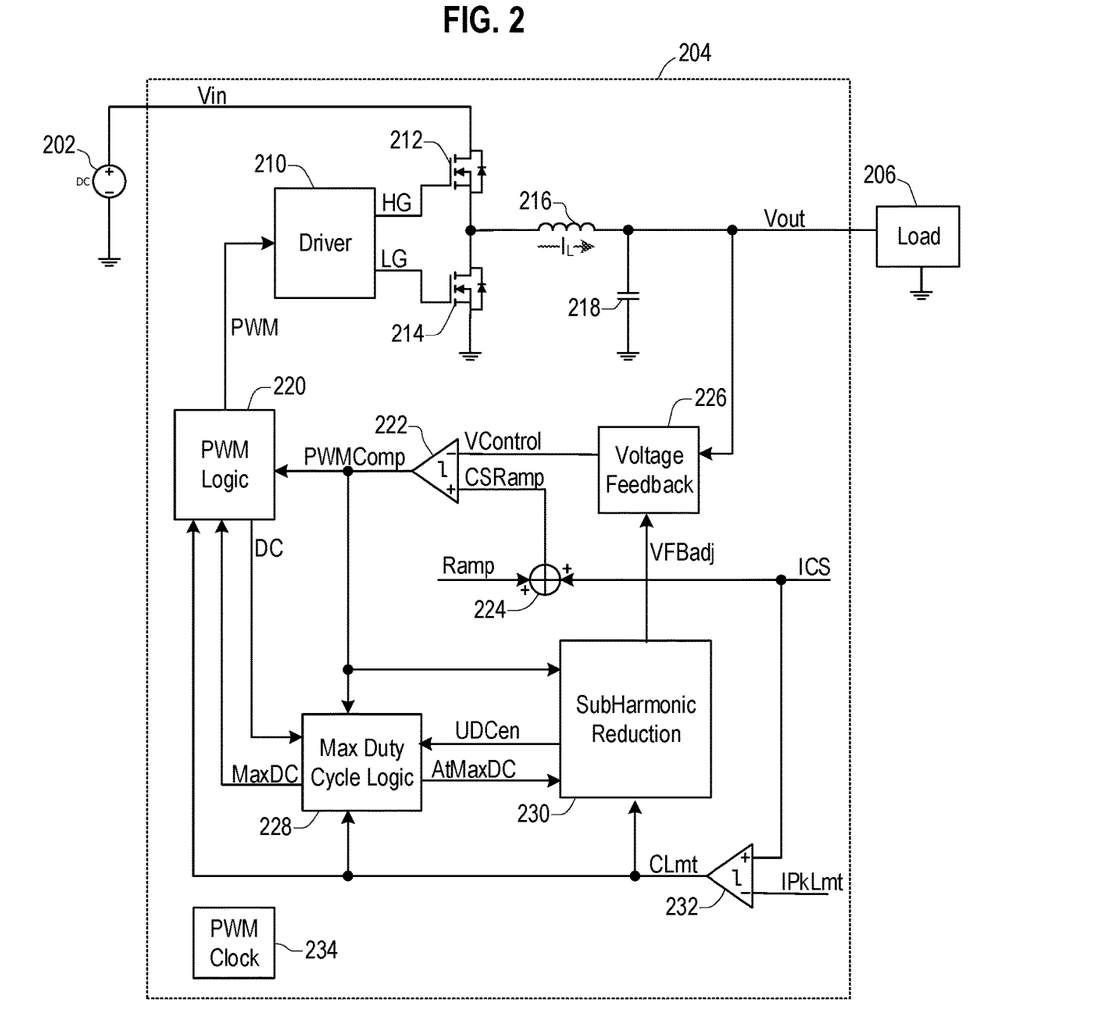
FIG. 2 illustrates a switching mode power supply according to an embodiment.

FIG. 2 illustrates a switching mode power supply (SMPS) 204 according to an embodiment. The SMPS 204 receives an input voltage Vin from a power source 202 and provides an output voltage Vout to a load 206. The power source 202, SMPS 204, and load 206 may respectively correspond to the power source 202, SMC 204, and load 206 of FIG. 1. The SMPS 204 shown in FIG. 2 is a buck converter, but embodiments are not limited thereto.

The SMPS 204 includes a driver circuit 210, a high switch 212, a low switch 215, an inductor 216, a capacitor 218, a PWM logic circuit 220, a first comparator 222, a summing circuit 224, a voltage feedback circuit 226, a max duty cycle logic circuit 228, a sub-harmonic reduction circuit 230, a second comparator 232, and a PWM clock circuit 234. The SMPS operates according to an PWM clock generated by the PWM clock circuit 234. The PWM clock may have a fixed frequency.

The driver circuit 210 generates a high gate signal HG and a low gate signal LG according to a pulse-width modulated (PWM) signal PWM. The driver circuit 210 may assert the high gate signal HG (such as by driving it to a high voltage) in response to an assertion of the PWM signal PWM, and de-assert the high gate signal HG (such as by driving it to a low voltage) in response to a de-assertion of the PWM signal PWM. The driver circuit 210 may assert the low gate signal LG in response to the de-assertion of the PWM signal PWM, and de-assert the high gate signal HG in response to the assertion of the PWM signal PWM. The driver circuit 210 may introduce a delay (referred to as a dead time) in the assertion of the high gate signal HG and in the assertion of the low gate signal LG to ensure that the switches that each signal drives is turned completely off before the switch the other signal drives is turned on.

The high switch 212 is turned on in response to the assertion of the high gate signal HG, and turned off in response to the de-assertion of the high gate signal HG. When the high switch 212 is on, current may flow from the input voltage Vin through the inductor 216 and to the load 206, storing energy in the inductor 216. The high switch 212 in FIG. 2 is shown as an n-channel Metal Oxide Semiconductor Field Effect Transistor (nMOSFET) but embodiments are not limited thereto.

The low switch 214 is turned on in response to the assertion of the low gate signal LG, and turned off in response to the de-assertion of the low gate signal LG. When the low switch 214 is on, current generated using the energy stored in the inductor 216 may flow to the load 206. The low switch 214 in FIG. 2 is shown as an n-channel Metal Oxide Semiconductor Field Effect Transistor (nMOSFET) but embodiments are not limited thereto.

The capacitor 218 operates to reduce the fluctuations in the output voltage Vout.

The voltage feedback circuit 226 generates a voltage control signal VControl having a magnitude determined according to the output voltage Vout, a reference voltage, and a feedback adjustment signal VFBadj. When the SMPS 204 is operating in peak current limit mode, the feedback adjustment signal VFBadj is controlled to reduce or eliminate sub-harmonic oscillations in the output voltage Vout.

In an embodiment, the feedback circuit 226 generates the voltage control signal VControl according to:

$$VControl = H(vref - (k1 \cdot Vout + k2 \cdot VFBadj)), \quad \text{Equation 1}$$

wherein VControl is a value of the voltage control signal Vcontrol, Vout is a value of the output voltage Vout, VFBadj is a value of the feedback adjustment signal VFBadj, vref is a value of the reference voltage, k1 is a value of a first scaling constant, k2 is a value of a second scaling constant, and H( ) is the transfer function of a compensator circuit (such as, for example, a filter circuit, an integrator circuit, a Proportional-Integral (PI) circuit, or a Proportional-Integral-Derivative (PID) circuit) of the feedback circuit 226. Operation of various embodiments of the voltage feedback circuit 226 will be described in more detail below.

The first comparator 222 compares the voltage control signal VControl to a current-sense plus ramp (CS+Ramp) signal CSRamp to generate a PWM comparison signal PWMComp. The first comparator 222 asserts the PWM comparison signal PWMComp when the CS+Ramp signal CSRamp is greater than the voltage control signal VControl, and de-asserts the PWM comparison signal PWMComp otherwise. Assertion of the PWM comparison signal PWMComp indicates to the PWM logic that the PWM signal should be de-asserted until the next cycle of the PWM clock.

The summing circuit 224 generates the CS+Ramp signal CSRamp by adding a ramp signal Ramp (i.e., a sawtooth signal) to an inductor current sense signal ICS. The inductor current sense signal ICS has a voltage corresponding to the inductor current $I_L$. In embodiments, the ramp signal Ramp may be reset to zero when the PWM signal PWM is de-asserted, and may increase at a constant rate when the PWM signal PWM is asserted. In some implementations, the rate at which the ramp signal Ramp increases may depend on the input voltage Vin, the output voltage Vout, or both. In some implementations, the ramp signal Ramp may be a compensation ramp signal.

The second comparator 232 generates a current limit signal CLmt by comparing the inductor current sense signal ICS to a peak current limit signal IPkLmt. When the inductor current sense signal ICS has a value greater than the peak current limit signal IPkLmt, the second comparator 232 asserts the current limit signal CLmt. Otherwise, the second comparator 232 de-asserts the current limit signal CLmt. In an embodiment, the value of the peak current limit signal IPkLmt corresponds to a peak current limit and is determined according to a programmable configuration register, but embodiments are not limited thereto.

The PWM logic circuit 220 generates the PWM signal PWM according to the PWM comparison signal PWMComp, the current limit signal CLmt, a maximum duty cycle signal MaxDC, and the PWM clock. The PWM logic circuit 220 asserts the PWM signal PWM at the beginning of each clock cycle of the PWM clock, and de-asserts the PWM signal PWM in response to any one of the assertion of the PWM comparison signal PWMComp, the duty cycle of the PWM signal equaling or exceeding the duty cycle indicated by the maximum duty cycle signal MaxDC, or the assertion of the current limit signal CLmt.

When the PWM logic circuit 220 de-asserts the PWM signal PWM in response to the assertion of the current limit signal CLmt, the PWM logic circuit 220 is operating in peak current limit mode. Accordingly, since the PWM logic circuit 220 is not de-asserting the PWM signal PWM in response to an assertion of the PWM comparison signal PWMComp, a reduction of sub-harmonic oscillation normally obtained through use of the ramp signal Ramp is not produced. Accordingly, embodiments use the feedback adjustment signal VFBadj generated by the sub-harmonic reduction circuit 230 to reduce or eliminate sub-harmonic oscillation when the PWM logic circuit 220 is operating in peak current limit mode.

The PWM logic circuit 220 also generates a duty cycle signal DC that indicates the current duty cycle of the PWM signal PWM.

The max duty cycle logic circuit 228 generates a max duty cycle indicator signal AtMaxDC by comparing the maximum duty cycle signal MaxDC to the duty cycle signal DC, asserting the max duty cycle indicator signal AtMaxDC to indicate that the duty cycle of the PWM signal is greater than or equal to the current maximum duty cycle. The max duty cycle logic circuit 228 generates the maximum duty cycle signal MaxDC according to the PWM comparison signal PWMComp, the current limit signal CLmt, an up/down (U/D) counter enable signal UDCen, and whether the duty cycle of the PWM signal is greater than or equal to the current maximum duty cycle. Operation of a max duty cycle logic circuit 228 according to an embodiment will be described in more detail below.

The sub-harmonic reduction circuit 230 generates the feedback adjustment signal VFBadj according to the current limit signal CLmt, the max duty cycle indicator signal AtMaxDC, and the PWM comparison signal PWMComp. The sub-harmonic reduction circuit 230 also generates the U/D counter enable signal UDCen, which is asserted when the sub-harmonic reduction circuit 230 is controlling the feedback adjustment signal VFBadj, thereby indicating that the SMPS 204 is operating in the peak current more.

When the SMPS 204 is operating in the peak current more, the sub-harmonic reduction circuit 230 increases or decreases a value of the feedback adjustment signal VFBadj according to the current limit signal CLmt, the max duty cycle indicator signal AtMaxDC, and the PWM comparison signal PWMComp. Operation of sub-harmonic reduction circuit 230 according to various embodiments will be described in more detail below.

Figure 3:
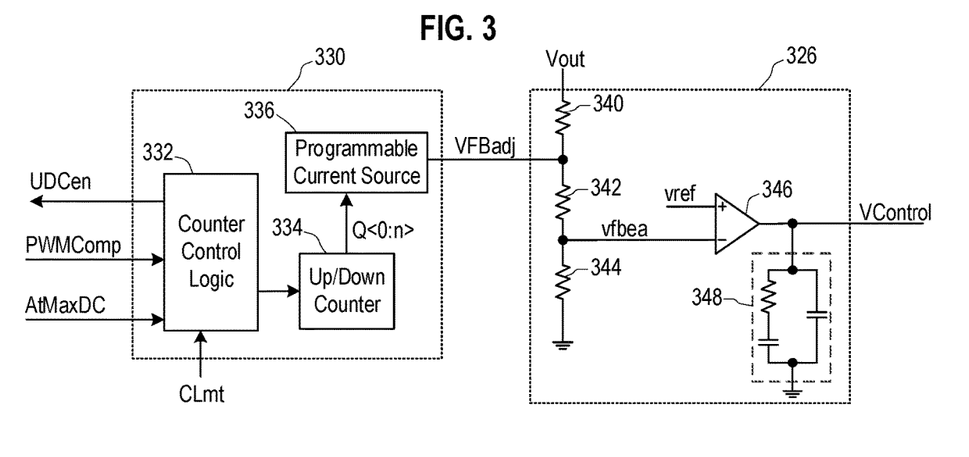
FIG. 3 illustrates a peak current limit mode sub-harmonic reduction circuit and a voltage feedback circuit according to a first embodiment.

FIG. 3 illustrates a sub-harmonic reduction circuit 330 and a voltage feedback circuit 326 according to an embodiment. The sub-harmonic reduction circuit 330 may be included in the sub-harmonic reduction circuit 230 of FIG. 2, and the voltage feedback circuit 326 may be included in the voltage feedback circuit 226 of FIG. 2.

The sub-harmonic reduction circuit 330 includes a counter control logic circuit 332, an Up/Down (U/D) counter 334, and a programmable current source 336. The voltage feedback circuit 326 includes a voltage divider comprising a first resistor 340, a second resistor 342, and a third resistor 344, an error amplifier 346, and a compensation network circuit 348.

The counter control logic circuit 332 transitions from a normal mode to a peak current limit mode in response to an assertion of the current limit signal CLmt. Upon entering the peak current limit mode, the counter control logic circuit 332 asserts the U/D counter enable signal UDCen.

When in the peak current limit mode, the counter control logic circuit 332 causes the U/D counter 334 to be incremented in response to the current limit signal CLmt or max duty cycle indicator signal AtMaxDC being asserted during a cycle of the PWM clock; that is, the U/D counter 334 is incremented when the duration of the assertion of the PWM signal PWM is being controlled by either the peak current limit or the maximum duty cycle.

While in the peak current limit mode, the counter control logic circuit 332 causes the U/D counter 334 to be decremented in response an assertion of the PWM comparison signal PWMComp; that is, the U/D counter 334 is decremented when the duration of the assertion of the PWM signal PWM is being controlled according to the value of the output voltage Vout as evaluated by the voltage feedback circuit 326.

In response to decrementing the U/D counter 334 reducing its count value to zero, the counter control logic circuit 332 transitions from the peak current limit mode to the normal mode and de-asserts the U/D counter enable signal UDCen.

Accordingly, while in the peak current limit mode the (n+1)-bit output Q<0:n> of the U/D counter 334 increases when the assertion of the PWM signal PWM is caused by an abnormal condition (e.g., because the inductor current equals or exceeds the peak current limit, or because the duty cycle meets or exceeds the maximum duty cycle), and decreases when the assertion of the PWM signal PWM is caused by a normal condition (e.g., by the feedback loop that regulates the output voltage Vout). In an embodiment, the output Q<0:n> of the U/D counter 334 is zero when not operating in the peak current limit mode.

The output Q<0:n> of the U/D counter 334 is provided to the programmable current source 336, which produces a current proportional to the value of the output Q<0:n> on the feedback adjustment signal VFBadj. In an embodiment, the programmable current source 336 may include a plurality of current sources[0 . . . n] connected together using respective switches[0 . . . n], wherein each switch[i] is controlled by a corresponding output Q[i], and wherein the current produced by a current source[i] when the corresponding switch [i] is on is equal to $k \times 2^i$, where k is a constant. However, embodiments are not limited thereto.

The current $I_{VFBadj}$ on the feedback adjustment signal VFBadj is provided to voltage divider of the voltage feedback circuit 326 at the junction of a second end of the first resistor 340 and a first end of the second resistor 342. An adjusted feedback voltage vfbea is produced at a junction of a second end of the second resistor 342 and a first end of the third resistor 344. The first end of the first resistor 340 receives the output voltage Vout, and the second end of the third resistor 344 is coupled to ground.

Accordingly, the value of the adjusted feedback voltage vfbea is:

$$vfbea = \frac{R3}{R1 + R2 + R3} \times (Vout + I_{VFBadj} \times R1) \qquad \text{Equation 2}$$

wherein R1, R2, and R3 are the resistances of the first, second, and third resistors 340, 342, and 344, respectively. Accordingly, during the peak current limit mode, when the output Q<0:n> of the U/D counter 334 has a positive value, the adjusted feedback voltage vfbea will be higher than it would be in the normal mode for the same output voltage.

As a result, the voltage control signal VControl produced by the error amplifier 346 will be lower than it would be if the output Q<0:n> of the U/D counter 334 was zero (that is, than it would be in the normal mode). When the voltage control signal VControl is lower, the first comparator 222 of FIG. 2 asserts the PWM comparison signal PWMComp earlier, reducing the amount of time the PWM signal PWM is asserted. Reducing the amount of time the PWM signal PWM is asserted reduces the amount of energy stored in the inductor 216 of FIG. 2, which reduces the output voltage Vout.

As the output voltage Vout is an input to the voltage divider of the voltage feedback circuit 326, the reduction in the output voltage Vout produced as detailed above operates as negative feedback, resulting in better regulation of the output voltage Vout during the peak current limit mode. Furthermore, as the circuits 330 and 326 operate to reduce the amount of time the PWM signal PWM is asserted in response to the assertion of the current limit signal Clmt, and reducing the amount of time the PWM signal PWM is asserted reduces the inductor current $I_L$, negative feedback that reduces the inductor current ripple is also supplied.

Figure 4:
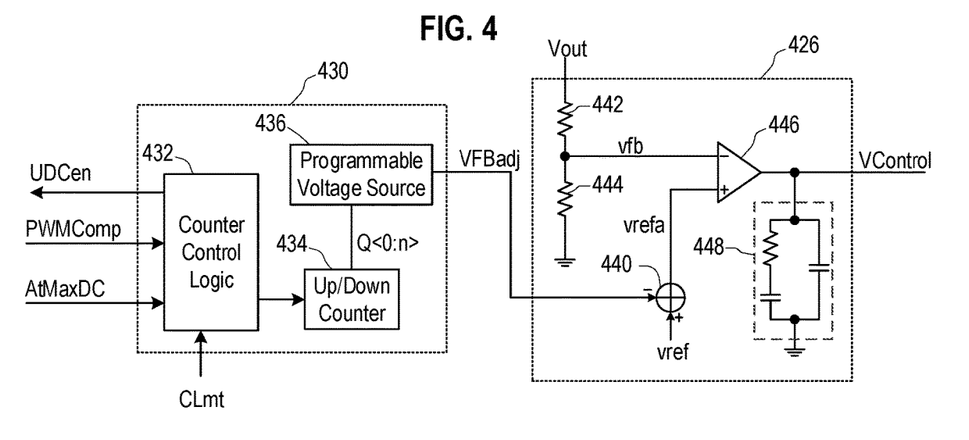
FIG. 4 illustrates a peak current limit mode sub-harmonic reduction circuit and a voltage feedback circuit according to a second embodiment.

FIG. 4 illustrates a sub-harmonic reduction circuit 430 and a voltage feedback circuit 426 according to another embodiment. The sub-harmonic reduction circuit 430 may be included in the sub-harmonic reduction circuit 230 of FIG. 2, and the voltage feedback circuit 426 may be included in the voltage feedback circuit 226 of FIG. 2.

The sub-harmonic reduction circuit 430 includes a counter control logic circuit 432, an Up/Down (U/D) counter 434, and a programmable voltage source 436. The voltage feedback circuit 426 includes a voltage divider comprising a first resistor 442 and a second resistor 444, a subtraction circuit 440, an error amplifier 446, and a compensation network circuit 448.

The counter control logic circuit 432 and the U/D counter 434 respectively operate in the same manners as the counter control logic circuit 332 and the U/D counter 334 of FIG. 3, and so further description thereof is omitted in the interest of brevity.

The programmable voltage source 436 produces a feedback adjustment signal VFBadj having a voltage corresponding to the value of the output Q<0:n> of the U/D counter 434. The programmable voltage source 436 may be a Digital-to-Analog Converter (DAC).

The voltage divider comprising a first resistor 442 and a second resistor 444 produces a feedback voltage vfb equal to Vout×R2/(R1+R2), where R1 is the resistance of the first resistor 442 and R2 is the resistance of the second resistor 444. Unlike in the circuit of FIG. 3, the output of the voltage divider is not affected by the feedback adjustment signal VFBadj.

Instead, the subtraction circuit 440 is used to alter the reference voltage vref. The subtraction circuit 440 subtracts the voltage value of the feedback adjustment signal VFBadj from the reference voltage vref to produce an adjusted voltage reference signal vrefa, and the error amplifier 446 produces the voltage control signal VControl according to the difference between the adjusted voltage reference signal vrefa and the feedback voltage vfb.

As a result, just as in FIG. 3, when in the peak current limit mode, the voltage control signal VControl produced by the voltage feedback circuit 426 will be lower than it would be if the output Q<0:n> of the U/D counter 334 was zero (that is, than it would be in the normal mode). Accordingly, regulation of the output voltage Vout is improved and an inductor ripple current may be reduced as described for FIG. 3.

Figure 5:
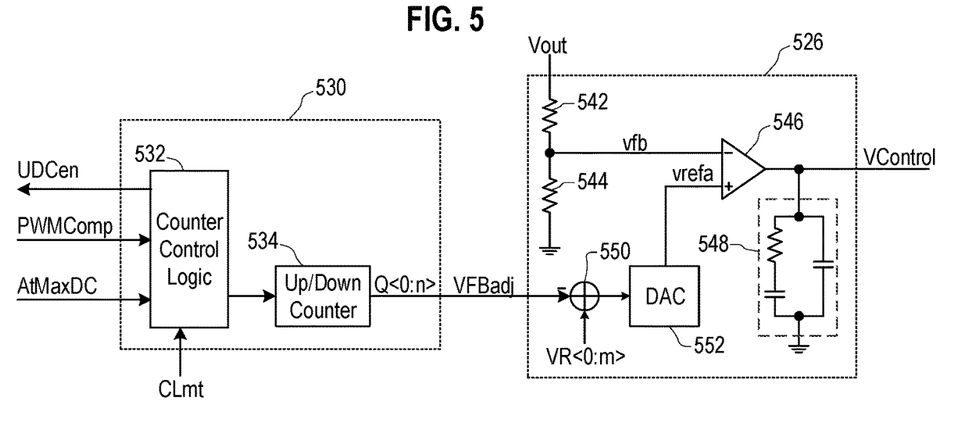
FIG. 5 illustrates a peak current limit mode sub-harmonic reduction circuit and a voltage feedback circuit according to a third embodiment.

FIG. 5 illustrates a sub-harmonic reduction circuit 530 and a voltage feedback circuit 526 according to another embodiment. The sub-harmonic reduction circuit 530 may be included in the sub-harmonic reduction circuit 230 of FIG. 2, and the voltage feedback circuit 526 may be included in the voltage feedback circuit 226 of FIG. 2.

The sub-harmonic reduction circuit 530 includes a counter control logic circuit 532 and an Up/Down (U/D) counter 534. The voltage feedback circuit 526 includes a voltage divider comprising a first resistor 542 and a second resistor 544, a digital subtraction circuit 550, a digital-to-analog converter (DAC) 552, an error amplifier 546, and a compensation network circuit 548.

The counter control logic circuit 532 and the U/D counter 534 respectively operate in the same manners as the counter control logic circuit 432 and the U/D counter 434 of FIG. 4, and so further description thereof is omitted in the interest of brevity. Furthermore, the voltage divider comprising the first and second resistors 542 and 544 operates in the same manner as the voltage divider comprising the first and second resistors 442 and 444 of FIG. 4, and further description thereof is omitted in the interest of brevity.

The circuits of FIG. 5 differ from the circuits of FIG. 4 in that the feedback adjustment signal VFBadj is provided to the voltage feedback circuit 526 in digital form, specifically as the output Q<0:n> of the U/D counter 534. The digital subtraction circuit 552 subtracts the multi-bit feedback adjustment signal VFBadj from a multi-bit digital reference voltage configuration signal VR<0:m> and provides the result to the DAC 552. The digital reference voltage configuration signal VR<0:m> may be provided by a configuration register.

The DAC 552 produces the adjusted reference voltage vrefa according to the value of the output of the digital subtraction circuit 552. As in FIG. 4, the adjusted reference voltage vrefa has a value equal to the value of the reference voltage expressed by the digital reference voltage configuration signal VR<0:m> minus the value of the feedback adjustment signal VFBadj. Accordingly, the circuits of FIG. 5 controls the voltage control signal VControl in the same manner as described for the circuits of FIG. 4, and further description thereof is omitted in the interest of brevity.

Figure 6:
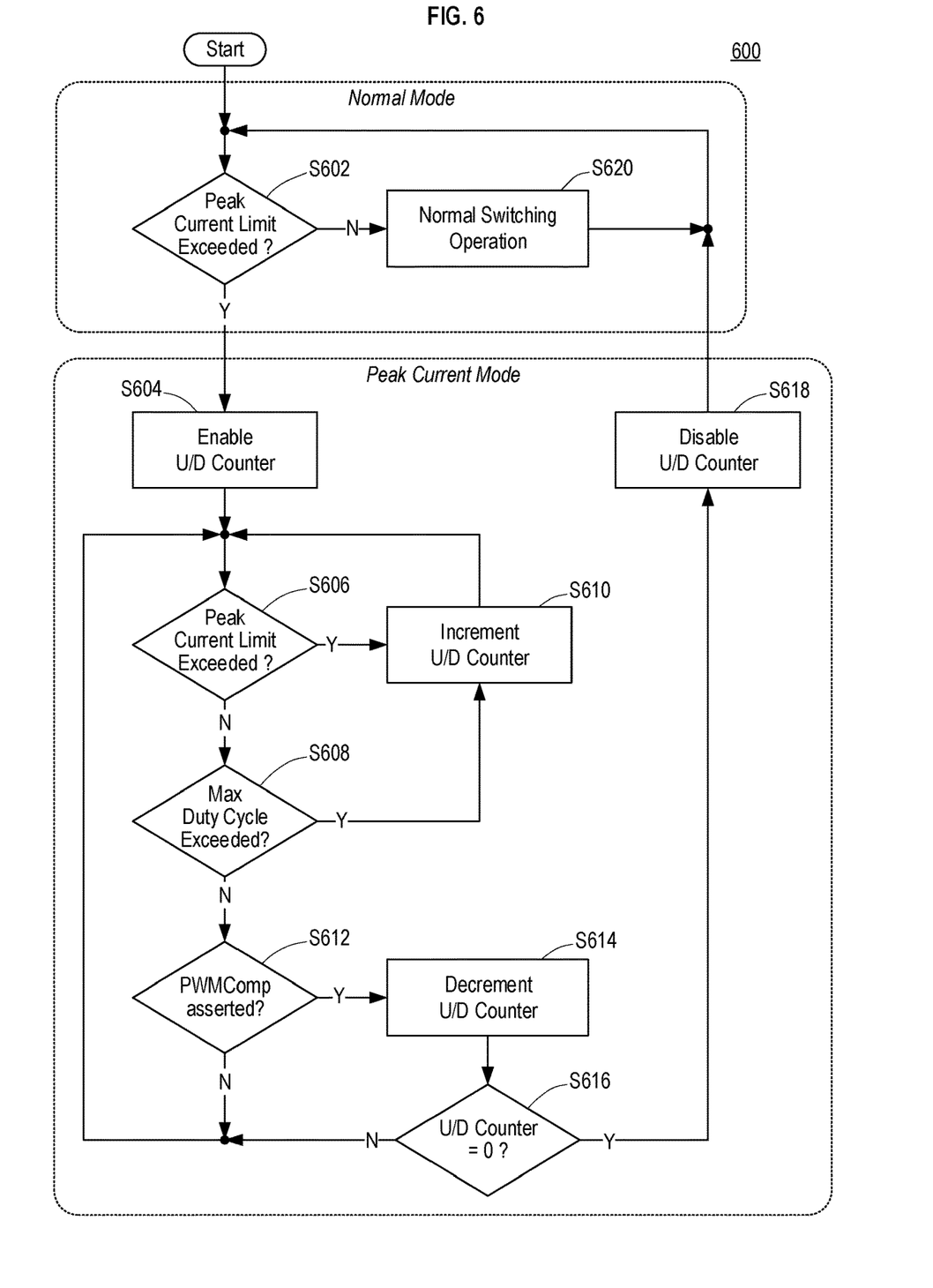
FIG. 6 illustrates a process for determine an adjustment for a voltage feedback circuit according to an embodiment.

FIG. 6 illustrates a process 600 for determining an adjustment for a voltage feedback circuit according to an embodiment. The process 600 may be performed by a sub-harmonic reduction circuit such as the sub-harmonic reduction circuit 230 of FIG. 2, and the voltage feedback circuit may be the voltage feedback circuit 226 of FIG. 2. The process 600 is presumed to start in the normal mode at S602.

The adjustment for the voltage feedback circuit is determined according to an output of an up/down (U/D) counter. The voltage feedback circuit may operate by determining a difference between a feedback voltage and a reference voltage. In an embodiment, the output of the up/down (U/D) counter is used to adjust the feedback voltage of the voltage feedback circuit, such as by increasing the feedback voltage. In another embodiment, the output of the up/down (U/D) counter is used to adjust the references voltage of the voltage feedback circuit, such as by decreasing the references voltage.

At S602, the process 600 determines whether a peak magnitude of a current (such as an inductor current) has reached or exceeded a peak current limit. In response to the peak magnitude of the current exceeding the peak current limit, the process 600 enters peak current limit mode by proceeding to S604; otherwise, the process 600 remains in normal mode and proceeds to S620.

At S604 the process 600 enables the up/down (U/D) counter. The U/D counter being enabled indicates that the peak current limit mode is in operation.

As S606, the process 600 determines whether the a peak value of a current, such as an inductor current, has exceeded a peak current limit. In response to the peak value of the current exceeding the peak current limit, at S606 the process 600 proceeds to S610; otherwise the process 600 proceeds to S608.

As S608, the process 600 determines whether a maximum duty cycle of a PWM signal has been exceeded. In response to the maximum duty cycle of a PWM signal being exceeded, at S608 the process 600 proceeds to S610; otherwise the process 600 proceeds to S612.

At S610, the process 600 increments the UD counter by a first constant, such as 1. The process 600 then returns to S606. In an embodiment, at S610 the process 600 waits until the end of the current cycle of the PWM clock before returning to S606 to prevent a race condition.

At S612, the process 600 determines whether a PWM comparison signal PWMComp has been asserted, which occurs when the duty cycle of the PWM signal is begin controlled by the output voltage (instead of being controlled by the peak current limit or the maximum duty cycle). In response to the PWM comparison signal PWMComp being asserted, at S612 the process 600 proceeds to S614; otherwise the process 600 returns to S606. In an embodiment, at S612 the process 600 waits until the end of the current cycle of the PWM clock before returning to S606 to prevent a race condition.

At S614, the process 600 decrements the UD counter by a second constant, such as 1. In an embodiment, the second constant used to decrement the UD counter may be different than the first constant used to increment the U/D counter.

In an embodiment, the first constant is greater than the second constant, which increases the duration of the peak current limit mode. In another embodiment, the second constant is greater than the first constant, which decreases the duration of the peak current limit mode. In another embodiment, the first constant is equal to the second constant.

At S614, the process 600 determines whether the value of the U/D counter is equal to zero. In response to the U/D counter being at zero, at S614 the process 600 proceeds to S618; otherwise the process 600 returns to S606. In an embodiment, at S612 the process 600 waits until the end of the current cycle of the PWM clock before returning to S606 to prevent a race condition.

At S618, the process 600 disables the U/D counter and transitions from the peak current limit mode to the normal mode. The process 600 then returns to S602. In an embodiment, at S618 the process 600 waits until the end of the current cycle of the PWM clock cycle returning to S602 to prevent a race condition.

Figure 7:
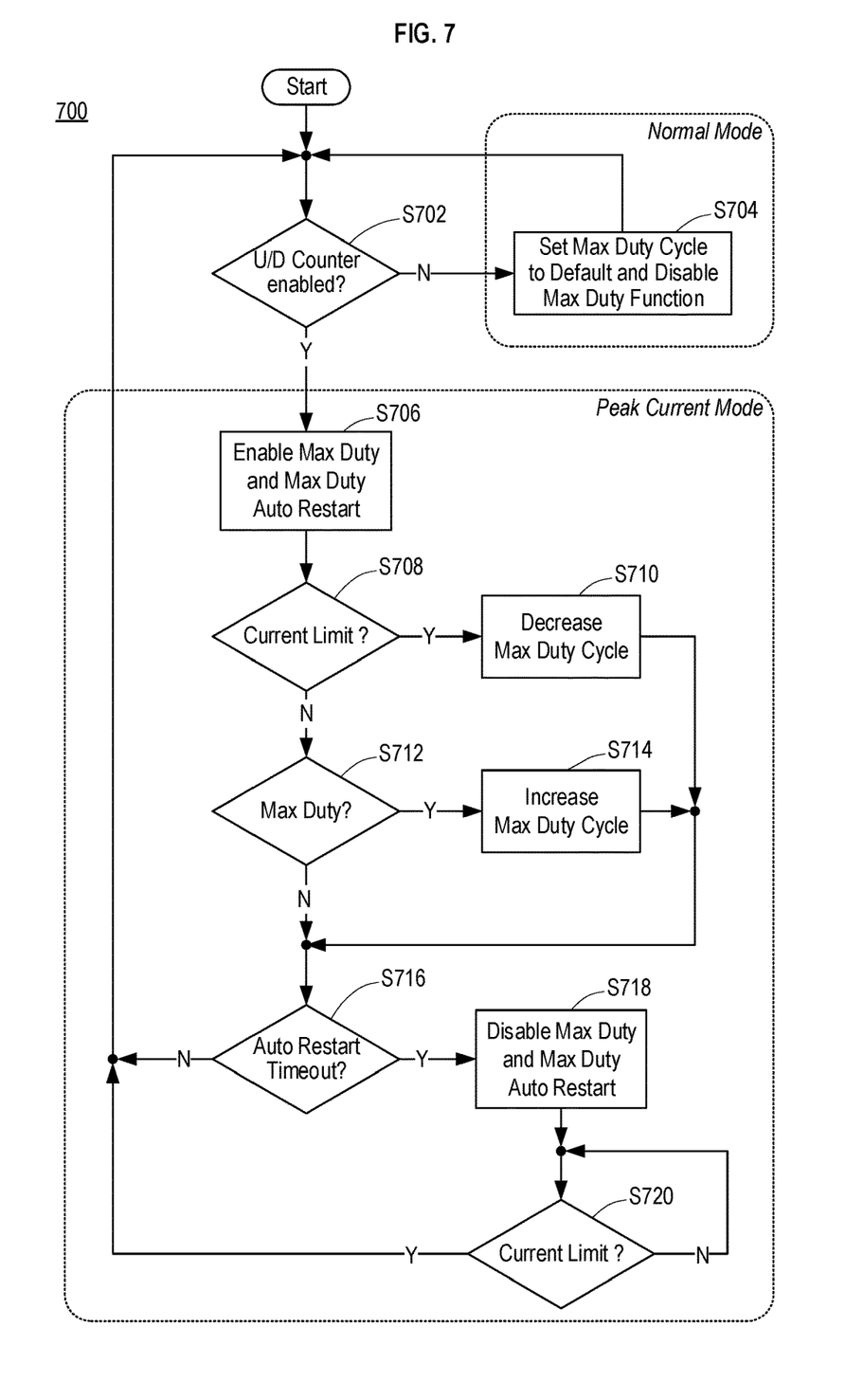
FIG. 7 illustrates a process for adjusting a maximum duty cycle according to an embodiment.

FIG. 7 illustrates a process 700 for adjusting a maximum duty cycle according to an embodiment. The process 700 may be performed by the max duty cycle logic circuit 228 of FIG. 2.

At S702, the process 700 determines whether an U/D counter used during a peak current limit mode is enabled; that is, whether the peak current limit mode is in operation. When the U/D counter is not enabled, indicating that the normal mode is in operation, at S702 the process 700 proceeds to S704. When the U/D counter is enabled, indicating that the peak current limit mode is in operation, at S702 the process 700 proceeds to S706.

At S704, the process 700 sets the maximum duty cycle to the default value and disables the maximum duty cycle function, because the duty cycle is not limited to a maximum value when operating in normal mode. The process 700 then returns to S702 at the beginning of the next PWM cycle.

At S706, the process 700, enables the maximum duty cycle function and the maximum duty cycle auto restart function. Enabling the maximum duty cycle restart function may include initializing and enabling a maximum duty cycle auto restart timer.

At S708, the process 700 determines whether the limit on the inductor current has been reached using the current limit signal CLmt. Accordingly, when the current limit signal CLmt is asserted, at S708 the process 700 proceeds to S710; otherwise the process 700 proceeds to S710.

At S710 the process 700 decreases the value of the maximum duty cycle. In an embodiment, the process 700 decreases the value of the maximum duty cycle by decreasing a value in a register. The amount of the decrease may be a constant (such as 1) or may be a programmable amount (such as an amount stored in a control register). The process 700 then proceeds to S716

At S712, the process 700 determines whether the maximum duty cycle limit has been exceeded using the max duty cycle indicator signal atMaxDC. Accordingly, when the max duty cycle indicator signal atMaxDC is asserted, at S712 the process 700 proceeds to S714; otherwise the process 700 proceeds to S716.

At S714 the process 700 increases the value of the maximum duty cycle. In an embodiment, the process 700 increases the value of the maximum duty cycle by increasing a value in a register. The amount of the increase may be a constant (such as 1) or may be a programmable amount (such as an amount stored in a control register). The process 700 then proceeds to S716

At S716, the process 700 determines whether the maximum duty cycle auto restart timer has expired. When the maximum duty cycle auto restart timer has expired, at S716 the process 700 proceeds to S718; otherwise the process 700 returns to S702 at the beginning of the next PWM cycle.

At S718, the process 700 disables the maximum duty cycle function and the maximum duty cycle auto restart function. The process 700 then proceeds to S720.

The process 700 remains at S720 until the current limit signal CLmt is asserted. In response to the current limit signal CLmt being asserted, the process 700 returns to S702 at the beginning of the next PWM cycle.

Embodiments of the present disclosure operate to reduce sub-harmonic oscillations in the output of a switching mode circuit operating in peak current limit mode. The switching mode circuit may be a fixed-frequency switching mode circuit. The switching mode circuit may be a Switched Mode Power Supply (SMPS).

When the switching mode circuit is operating in the peak current limit mode, embodiments reduce sub-harmonic oscillations by providing an adjustment to a voltage feedback circuit of the switched mode circuits. The adjustment is determined according to an up/down counter controlled according to conditions that may arise in the switching mode circuit, such as a current limit condition, a maximum duty cycle condition, and a result of a comparison performed using the output of the voltage feedback circuit.

When the switching mode circuit is operating in the peak current limit mode, embodiments may further control a maximum duty cycle limit to reduce ripple current in an energy storage inductor of the switching mode circuit.

Embodiments of the present disclosure include electronic devices, e.g., one or more packaged semiconductor devices, configured to perform one or more of the operations described herein. However, embodiments are not limited thereto.

While this invention has been described in connection with what is presently considered to be practical embodiments, embodiments are not limited to the disclosed embodiments, but, on the contrary, may include various modifications and equivalent arrangements included within the spirit and scope of the appended claims. The order of operations described in a process is illustrative and some operations may be re-ordered. Further, two or more embodiments may be combined.

What is claimed is:

1. An electronic circuit, comprising:
   a Pulse Width Modulation (PWM) circuit configured to produce a PWM signal according to a voltage control signal, a current of the electronic circuit, and a maximum duty cycle;
   a sub-harmonic reduction circuit configured to generate a feedback adjustment signal by determining whether the electronic circuit is operating in a peak current limit mode, and when the electronic circuit is operating in the peak current limit mode, determining a value of the feedback adjustment signal according to whether the current of the electronic circuit exceeds a peak current limit, whether a duty cycle of the PWM signal is greater than or equal to the maximum duty cycle, whether the voltage control signal is controlling the duty cycle of the PWM signal, or combinations thereof; and
   a voltage feedback circuit configured to generate the voltage control signal according to an output voltage produced using the PWM signal, a value of a reference voltage, and a value of the feedback adjustment signal.

2. The electronic circuit of claim 1, wherein the sub-harmonic reduction circuit is configured to:
   set the value of the feedback adjustment signal to a first value greater than zero in response to the current of the electronic circuit exceeding the peak current limit when the electronic circuit is not operating in the peak current limit mode; and
   determine that the electronic circuit is operating in the peak current limit mode when the value of the feedback adjustment signal is greater than zero; and that the electronic circuit is not operating in the peak current limit mode when the value of the feedback adjustment signal is zero.

3. The electronic circuit of claim 1, wherein the sub-harmonic reduction circuit is configured to, when the electronic circuit is operating in the peak current limit mode:
   increase the value of the feedback adjustment signal in response to the duty cycle of the PWM signal of the electronic circuit being greater than or equal to the maximum duty cycle or the current of the electronic circuit exceeding the peak current limit; and
   decrease the value of the feedback adjustment signal in response to the voltage control signal controlling the duty cycle of the PWM signal.

4. The electronic circuit of claim 1, wherein the voltage feedback circuit generates the voltage control signal according to:

$$VControl = H(vref - (k1 \cdot Vout + k2 \cdot VFBadj))$$

wherein VControl is a value of the voltage control signal, Vout is a value of the output voltage, VFBadj is the value of the feedback adjustment signal, vref is the value of the reference voltage, k1 is a value of a first scaling factor, k2 is a value of a second scaling factor, and H is a transfer function of a compensator of the voltage feedback circuit.

5. The electronic circuit of claim 1, wherein the current of the electronic circuit is a current flowing in an inductor and controlled using the PWM signal.

6. The electronic circuit of claim 1, further comprising a max duty cycle circuit configured to control the maximum duty cycle to have a default value when the electronic circuit is not operating in the peak current limit mode and a value less than the default value when the electronic circuit is operating in the peak current limit mode.

7. An electronic circuit, comprising:
   a Pulse Width Modulation (PWM) comparator circuit configured to produce a PWM comparison signal according to a voltage control signal;
   a Pulse Width Modulation (PWM) circuit configured to receive the PWM comparison signal and a current limit signal, and to produce a PWM signal according to the PWM comparison signal, the current limit signal, and a maximum duty cycle;
   a sub-harmonic reduction circuit configured to receive the current limit signal, the PWM comparison signal, and a duty cycle signal indicating whether a duty cycle of the PWM signal is greater than the maximum duty cycle, determine whether the electronic circuit is operating in a peak current limit mode, and produce a feedback adjustment signal according to the current limit signal, the PWM comparison signal, the duty cycle indication, and whether the electronic circuit is operating in the peak current limit mode; and
   a voltage feedback circuit configured to produce the voltage control signal according to an output voltage, a value of a reference voltage, and a value of the feedback adjustment signal,
   wherein the inductor current is controlled using the PWM signal,
   wherein the output voltage is produced using the inductor current, and
   wherein the current limit signal indicates whether the inductor current is greater than a peak current limit value.

8. The electronic circuit of claim 7, wherein the PWM comparator circuit is configured to assert the PWM comparison signal when the voltage control signal is less than a sum of a value corresponding to the inductor current and a value of a ramp signal, and de-asserts the PWM comparison signal otherwise.

9. The electronic circuit of claim 8, wherein the sub-harmonic reduction circuit is configured to:
   when the electronic circuit is not operating in the peak current limit mode, set the value of an up/down counter to a value greater than zero in response to the current limit signal indicating that the inductor current is greater than the peak current limit value;
   when the electronic circuit is operating in the peak current limit mode, increase the value of the up/down counter in response to the current limit signal indicating that the inductor current is greater than the peak current limit value or the duty cycle signal indicating that the duty cycle of the PWM signal is greater than the maximum duty cycle;
   when the electronic circuit is operating in the peak current limit mode, decrease the value of the up/down counter in response to an assertion of the PWM comparison signal; and determine whether the electronic circuit is operating in the peak current limit mode by determining whether the value of the up/down counter is greater than zero.

10. The electronic circuit of claim 9,
wherein the sub-harmonic reduction circuit comprises a programmable current source configured to produce the feedback adjustment signal having a current corresponding to the value of the up/down counter; and
wherein the voltage feedback circuit comprises:
a voltage divider configured to produce an adjusted feedback voltage according to the output voltage and the current of the feedback adjustment signal, and
an error amplifier configured to produce the voltage control signal according to a difference between the adjusted feedback voltage and the reference voltage.

11. The electronic circuit of claim 9,
wherein the sub-harmonic reduction circuit comprises a programmable voltage source configured to produce the feedback adjustment signal having a voltage corresponding to the value of the up/down counter; and
wherein the voltage feedback circuit comprises:
a voltage divider configured to produce a feedback voltage according to the output voltage,
a subtractor circuit configured to produce an adjusted reference voltage by subtracting the voltage of the feedback adjustment signal from the reference voltage, and
an error amplifier configured to produce the voltage control signal according to a difference between the feedback voltage and the adjusted reference voltage.

12. The electronic circuit of claim 9,
wherein the feedback adjustment signal is a first multi-bit digital signal having a value corresponding to the value of the up/down counter; and
wherein the voltage feedback circuit comprises:
a voltage divider configured to produce a feedback voltage according to the output voltage,
a conversion circuit configured to subtract the feedback adjustment signal from a second multi-bit digital signal having a value corresponding to the reference value and to produce an adjusted reference voltage corresponding to a result of the subtraction, and
an error amplifier configured to produce the voltage control signal according to a difference between the feedback voltage and the adjusted reference voltage.

13. The electronic circuit of claim 7, further comprising:
a max duty cycle circuit configured to control the maximum duty cycle to have a default value when the electronic circuit is not operating in the peak current limit mode and a value less than the default value when the electronic circuit is operating in the peak current limit mode.

14. The electronic circuit of claim 7, wherein the electronic circuit operates as a fixed-frequency current mode switching circuit.

15. A method of controlling an electronic circuit, the method comprising:
determining whether the electronic circuit is operating in a peak current limit mode;
when the electronic circuit is operating in the peak current limit mode, determining a value of a feedback adjustment signal according to whether a current of the electronic circuit exceeds a peak current limit, whether a duty cycle of a PWM signal of the electronic circuit is greater than or equal to a maximum duty cycle, whether a voltage control signal is controlling the duty cycle of the PWM signal, or combinations thereof;
producing the voltage control signal according to an output voltage produced using the PWM signal, a value of a reference voltage, and a value of the feedback adjustment signal;
producing the PWM signal according to the voltage control signal, the current of the electronic circuit, and the maximum duty cycle.

16. The method of claim 15, further comprising:
setting the feedback adjustment signal to an initial value greater than zero in response to the current of the electronic circuit exceeding the peak current limit when the electronic circuit is not operating in the peak current limit mode; and
determining whether the electronic circuit is operating in the peak current limit mode by determining that the feedback adjustment signal has a value greater than zero.

17. The method of claim 15, further comprising:
when the electronic circuit is operating in the peak current limit mode:
increasing the value of the feedback adjustment signal in response to the duty cycle of the PWM signal being greater than or equal to the maximum duty cycle or the current of the electronic circuit exceeding the peak current limit;
decreasing the value of the feedback adjustment signal in response to the voltage control signal controlling the duty cycle of the PWM signal.

18. The method of claim 15, further comprising producing the voltage control signal according to:

$$VControl = H(vref - (k1 \cdot Vout + k2 \cdot VFBadj))$$

wherein VControl is a value of the voltage control signal, Vout is a value of the output voltage, VFBadj is the value of the feedback adjustment signal, vref is a value of the reference voltage, k1 is a value of a first scaling factor, k2 is a value of a second scaling factor, and H is a transfer function of a compensator of the voltage feedback circuit.

19. The method of claim 15, wherein the current of the electronic circuit is a current flowing in an inductor and controlled using the PWM signal.

20. The method of claim 15, further comprising:
when the electronic circuit is operating in the peak current limit mode, setting the maximum duty cycle to a value less than a default value,
wherein when the electronic circuit is not operating in the peak current limit mode, the maximum duty cycle has the default value.

* * * * *